United States Patent
Yu et al.

(10) Patent No.: US 11,092,825 B2
(45) Date of Patent: Aug. 17, 2021

(54) OPTOELECTRONIC DEVICE INCLUDING ANTI-REFLECTIVE COATINGS AND METHOD OF MANUFACTURING THEREOF

(71) Applicant: ROCKLEY PHOTONICS LIMITED, London (GB)

(72) Inventors: Guomin Yu, Glendora, CA (US); Aaron Zilkie, Pasadena, CA (US)

(73) Assignee: Rockley Photonics Limited, Oxford (GB)

( * ) Notice: Subject to any disclaimer, the term of this patent is extended or adjusted under 35 U.S.C. 154(b) by 0 days.

(21) Appl. No.: 16/408,381

(22) Filed: May 9, 2019

(65) Prior Publication Data
US 2019/0346704 A1 Nov. 14, 2019

(30) Foreign Application Priority Data

May 11, 2018 (GB) .................................... 1807708

(51) Int. Cl.
*G02F 1/017* (2006.01)
*G02F 1/015* (2006.01)

(52) U.S. Cl.
CPC ........ *G02F 1/01708* (2013.01); *G02F 1/0157* (2021.01); *G02F 2201/38* (2013.01); *G02F 2202/108* (2013.01)

(58) Field of Classification Search
CPC ................. G02F 1/01708; G02F 2001/0157
USPC ........................................................... 385/2
See application file for complete search history.

(56) References Cited

U.S. PATENT DOCUMENTS

| | | | | |
|---|---|---|---|---|
| 6,522,799 B1* | 2/2003 | Bazylenko | ............ | G02B 6/132 385/14 |
| 6,737,718 B2* | 5/2004 | Takeuchi | ............ | H01L 31/024 257/431 |
| 8,160,404 B2* | 4/2012 | Pan | ............ | G02F 1/025 385/2 |
| 8,871,554 B2* | 10/2014 | Hill | ............ | G02F 1/025 438/69 |
| 9,496,431 B2* | 11/2016 | Krasulick | ............ | H01S 5/3013 |
| 10,649,245 B1* | 5/2020 | Bian | ............ | G02F 1/025 |
| 2002/0191916 A1* | 12/2002 | Frish | ............ | G02B 6/305 385/43 |

(Continued)

FOREIGN PATENT DOCUMENTS

GB   2350719 A   12/2000
WO   9857230 A1  12/1998

OTHER PUBLICATIONS

U.K. Intellectual Property Office Search Report, Dated Sep. 28, 2018, for Patent Application No. GB1807708.1, 3 pages.

(Continued)

*Primary Examiner* — Rhonda S Peace
(74) *Attorney, Agent, or Firm* — Lewis Roca Rothgerber Christie, LLP

(57) ABSTRACT

An optoelectronic device and a method of manufacturing the same. The device comprising: a multi-layered optically active stack; an input waveguide, arranged to guide light into the stack; an output waveguide, arranged to guide light out of the stack; and anti-reflective coatings, located between both the input waveguide and the stack and the stack and the output waveguide; wherein the input waveguide and output waveguide are formed of silicon nitride.

21 Claims, 20 Drawing Sheets

(56) References Cited

U.S. PATENT DOCUMENTS

| | | | | |
|---|---|---|---|---|
| 2003/0197184 | A1* | 10/2003 | Kaneko | H01S 5/18388 257/79 |
| 2004/0114654 | A1* | 6/2004 | Kaneko | H01S 5/18391 372/46.01 |
| 2007/0034858 | A1* | 2/2007 | Ng | B82Y 10/00 257/14 |
| 2008/0238264 | A1* | 10/2008 | Nakamura | H01L 41/0472 310/364 |
| 2010/0308363 | A1* | 12/2010 | Kim | H01L 33/505 257/98 |
| 2010/0330727 | A1* | 12/2010 | Hill | G02F 1/025 438/69 |
| 2012/0134072 | A1* | 5/2012 | Bae | H01G 11/28 361/502 |
| 2013/0051727 | A1 | 2/2013 | Mizrahi et al. | |
| 2016/0084761 | A1* | 3/2016 | Rothberg | C12Q 1/6869 506/4 |
| 2016/0315452 | A1* | 10/2016 | Chen | G02B 6/305 |
| 2019/0346704 | A1* | 11/2019 | Yu | G02F 1/01708 |
| 2020/0363662 | A1* | 11/2020 | Yu | G02F 1/017 |

OTHER PUBLICATIONS

U.K. Intellectual Property Office Examination Report, dated Jan. 13, 2020, for Patent Application No. GB1807708.1, 3 pages.

\* cited by examiner

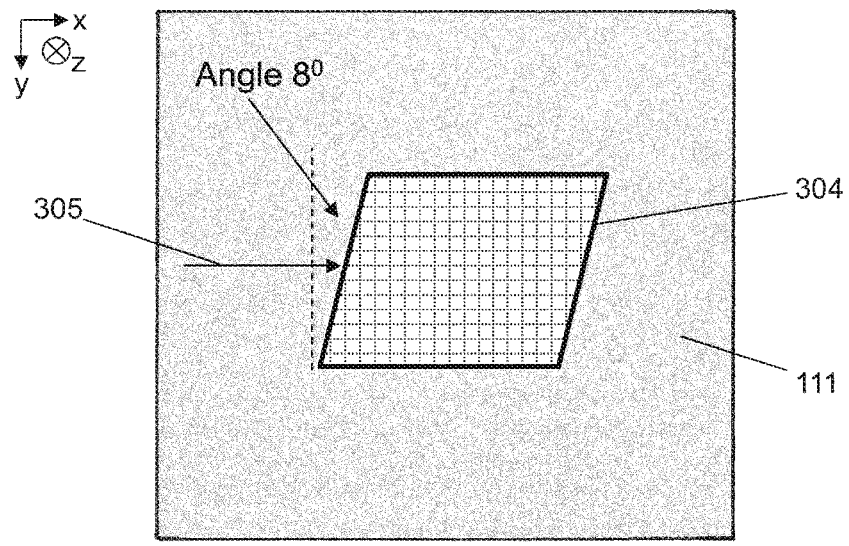
Fig. 3D(i)
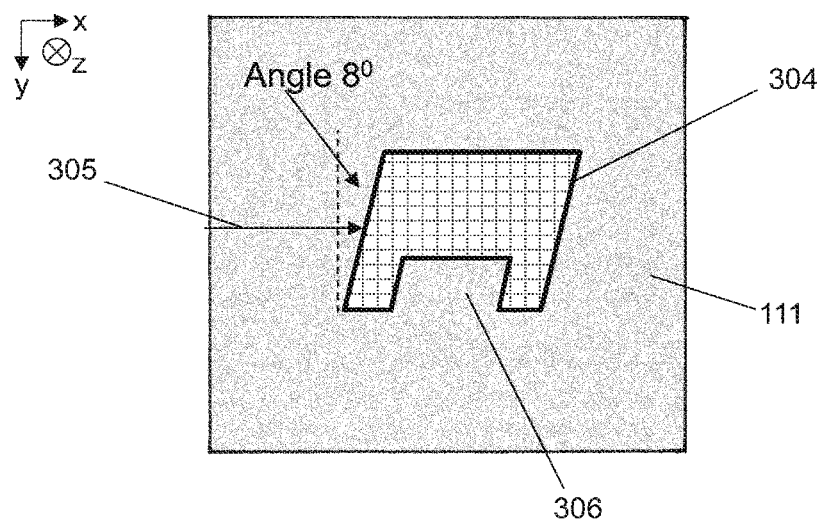
Fig 3D(ii)

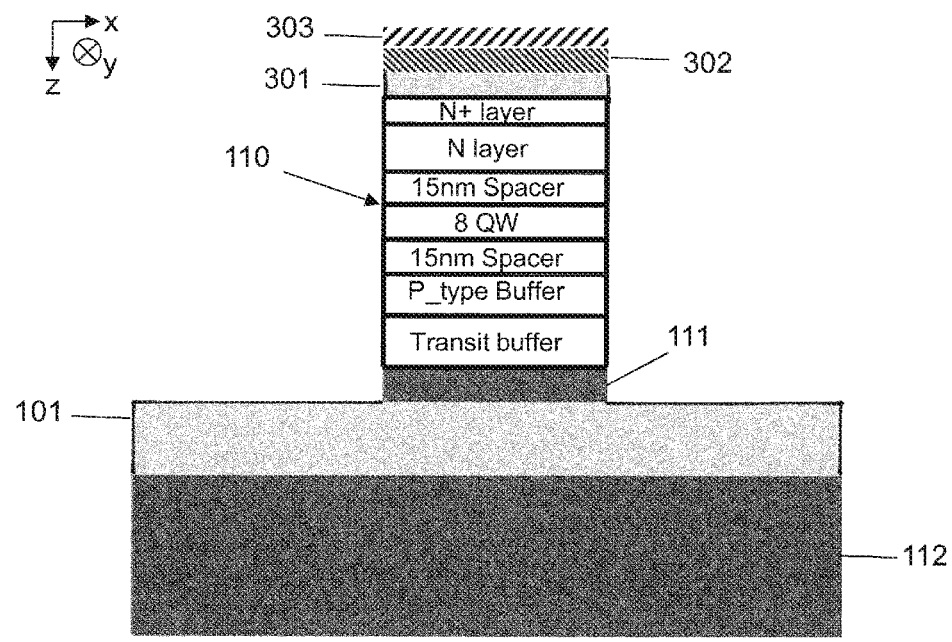
Fig. 3E
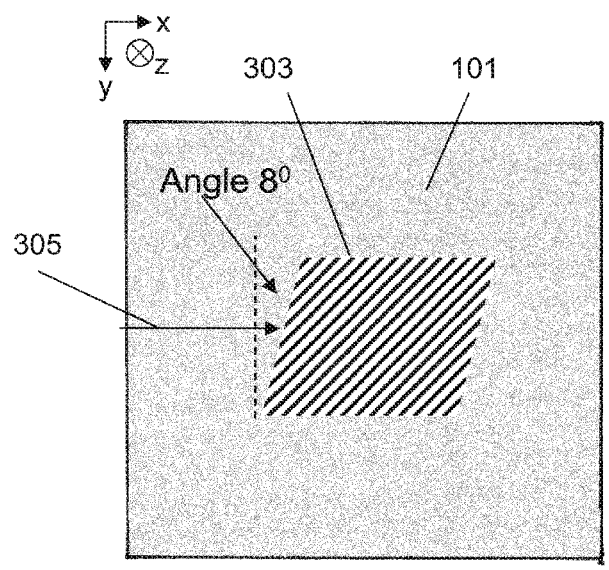   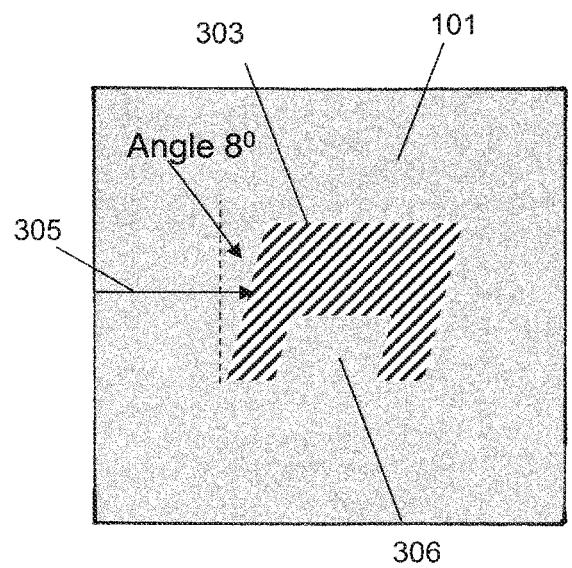
Fig. 3E(i)                Fig. 3E(ii)

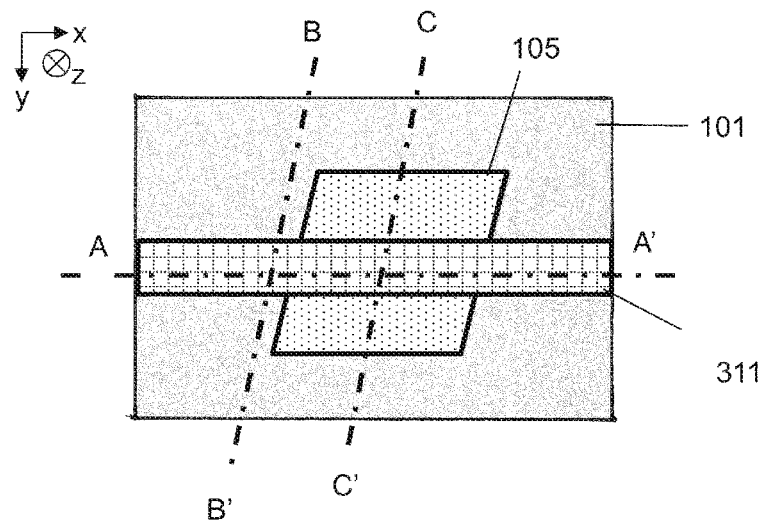
Fig. 3N(a)(i)
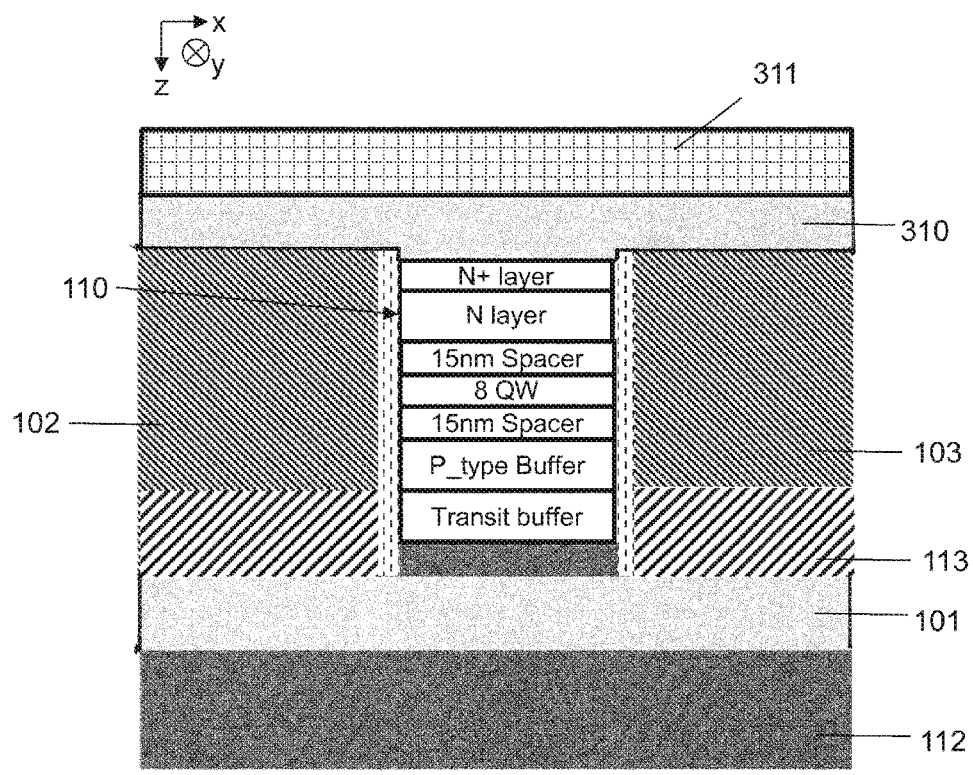
Fig. 3N(b)(i)

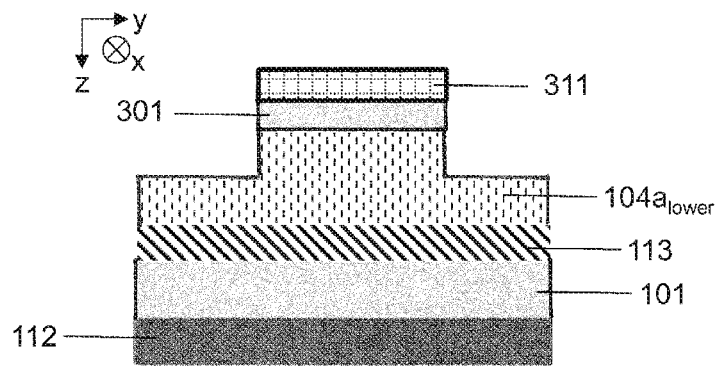
Fig. 3N(c)(i)
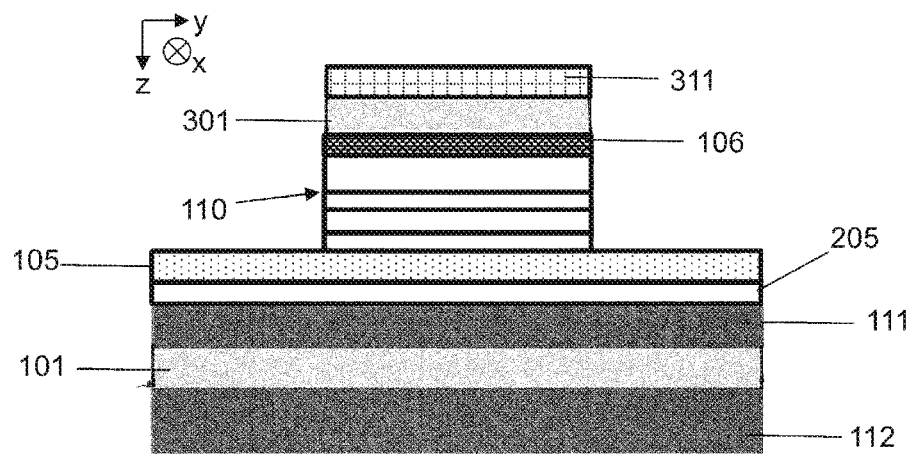
Fig. 3N(d)(i)

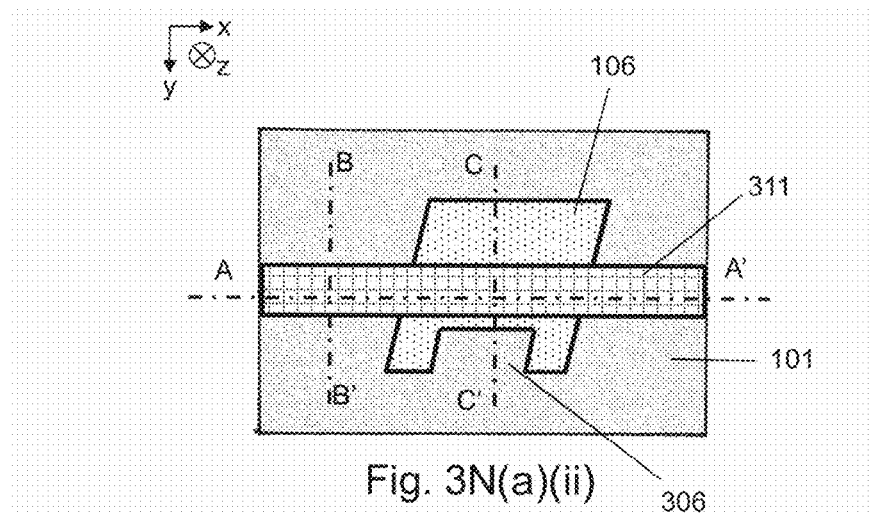
Fig. 3N(a)(ii)
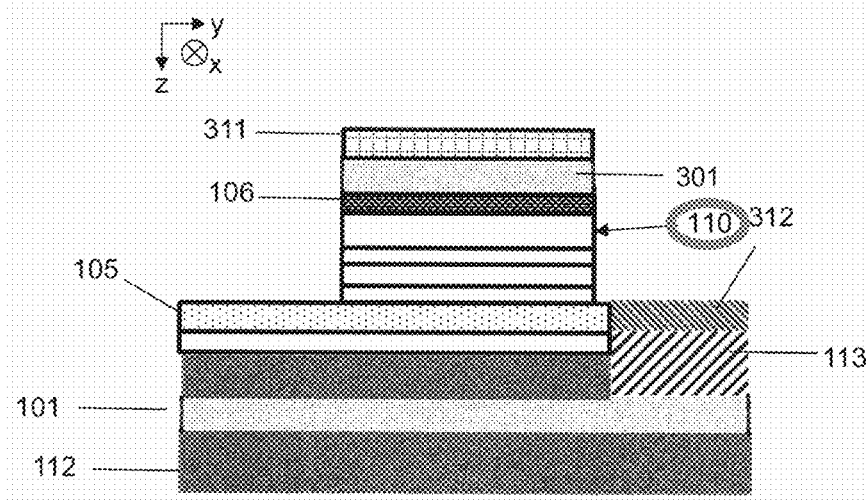
Fig. 3N(b)(ii)

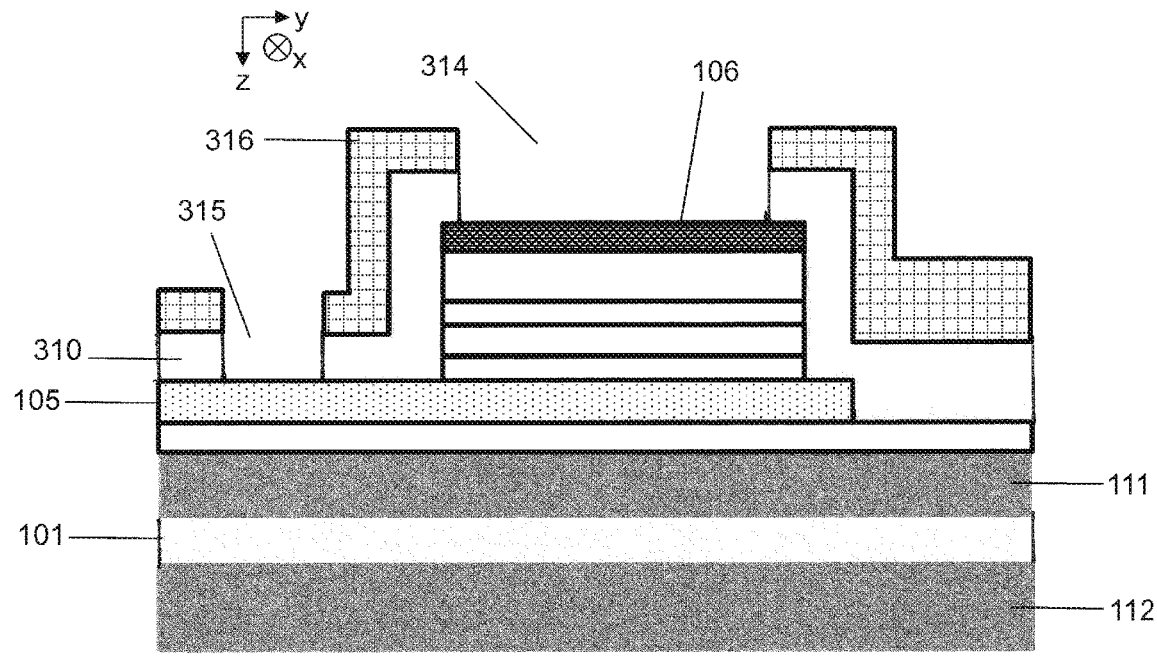
Fig. 3P(c)(i)
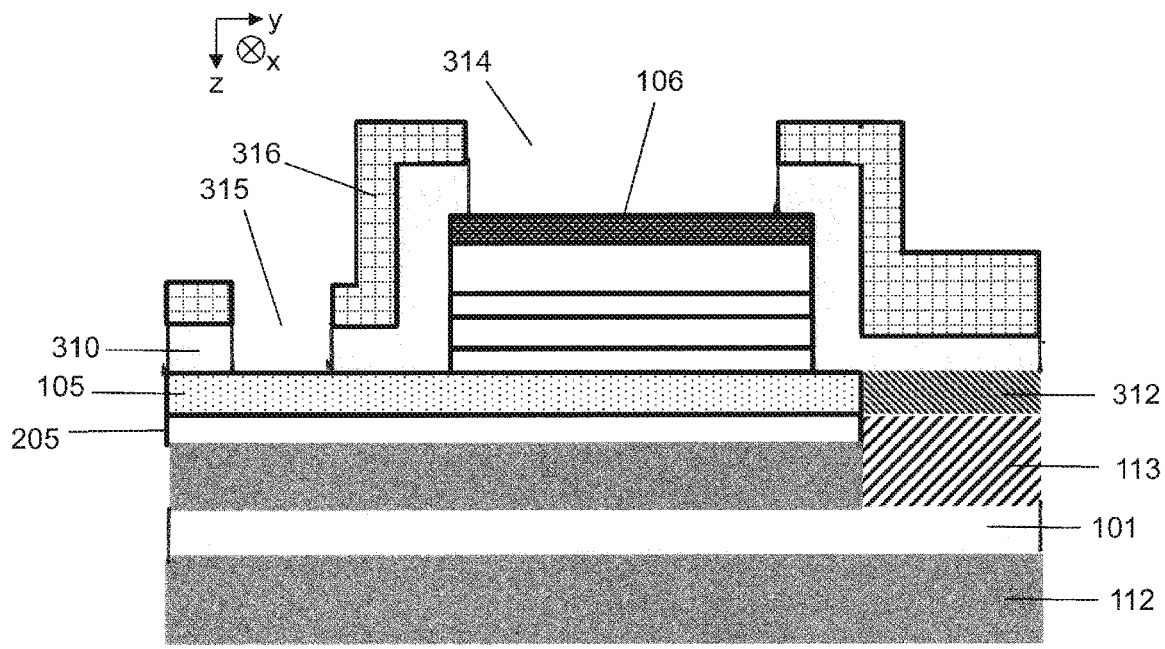
Fig. 3P(c)(ii)

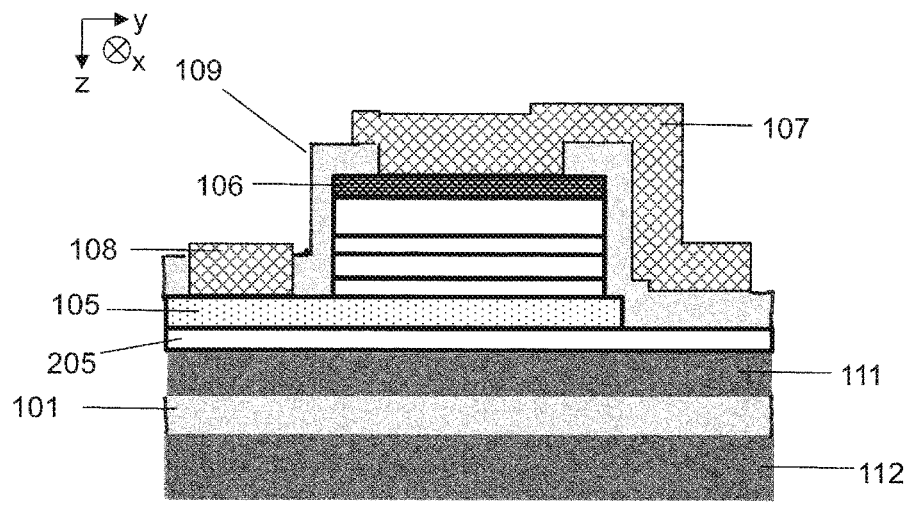
Fig. 3Q(c)(i)
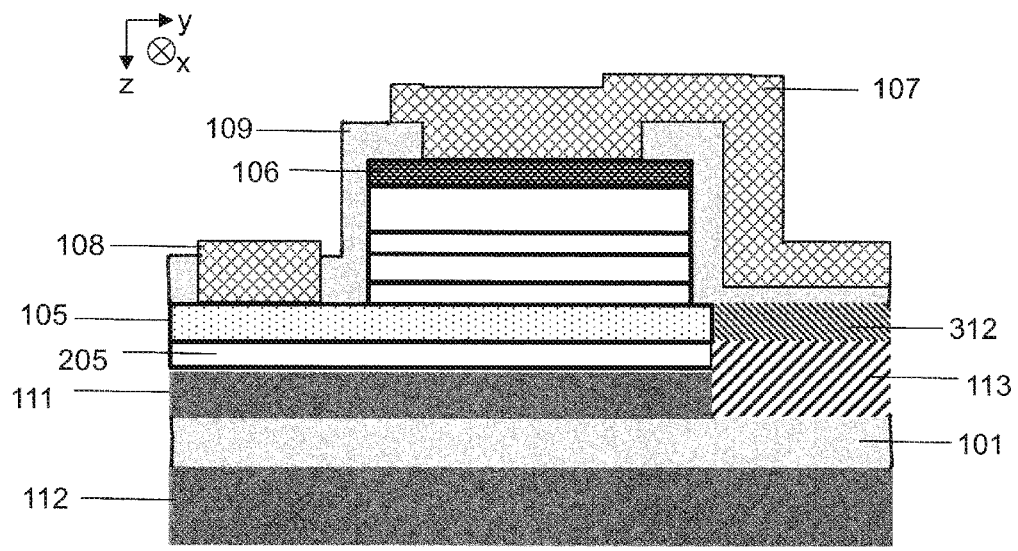
Fig. 3Q(c)(ii)

OPTOELECTRONIC DEVICE INCLUDING ANTI-REFLECTIVE COATINGS AND METHOD OF MANUFACTURING THEREOF

CROSS-REFERENCE TO RELATED APPLICATION(S)

The present application claims priority to United Kingdom Patent Application No. GB 1807708.1, filed May 11, 2018, the entire content of which is incorporated herein by reference.

FIELD OF THE INVENTION

The present invention relates to an optoelectronic device, and particularly optoelectronic devices including silicon nitride anti-reflective coatings.

BACKGROUND

There are many challenges to integrating SiGe quantum confined Stark effect (QCSE) electro-absorption modulators (EAMs) with silicon waveguides on silicon-on-insulator platforms either with evanescent coupling structures, edge coupling structures, or with evanescent edge coupling structures. Generally, SiGe QCSE EAMs with evanescent coupling structures are too sensitive to fabrication variations. Similarly, SiGe QCSE EAMs with edge coupling structures are prone to failure during the amorphous or SiGe filling processors. Further, SiGe QCSE EAMs with evanescent edge coupling structures are very sensitive to fabrication processes and the SiGe regrowth process.

However it is desirable to make SiGe QCSE EAMs using a simple and consistent fabrication process, which are insensitive to process variations.

Therefore it would be useful, to integrate a SiGe QCSE EAM with waveguides on a silicon-on-insulator platform with a simple fabrication process which is insensitive to process variations in addition to providing a low optical coupling loss.

SUMMARY

Accordingly, some embodiments of the invention provide an optoelectronic device comprising a multi-quantum well epitaxial structure, connected to silicon nitride waveguides via an anti-reflective coatings (ARC).

In a first aspect, some embodiments of the invention provide an optoelectronic device, comprising:
  a multi-layered optically active stack;
  an input waveguide, arranged to guide light into the stack
  an output waveguide, arranged to guide light out of the stack; and
  anti-reflective coatings, located between both the input waveguide and the stack and the stack and the output waveguide;
  wherein the input waveguide and the output waveguide are formed of silicon nitride.

The silicon nitride forming the input waveguide and output waveguide may be formed of regular silicon nitride, and may be formed with a refractive index of 2.2, while the ARC layer may be formed of silicon-rich silicon nitride with refractive index 2.8.

In some examples, the multi-layered optically active stack is a multiple quantum well, MQW, waveguide. That is to say, the term multi-layered optically active stack may be read as multiple quantum well waveguide throughout.

With such a structure, it is possible to achieve a coupling efficiency either from the input waveguide through the anti-reflective coating to the multi-layered optically active stack (which may be a MQW waveguide), and from the stack through the anti-reflective coating to the output waveguide, of around 96.1%. Therefore a combined coupling loss experienced by light passing from the input waveguide to the output waveguide may be around 0.36 dB.

The input waveguide may be coupled to guide light into the stack by providing a guiding direction directed substantially into the stack, either directly or through the anti-reflective coating. Light may enter the input waveguide, which has an optical mode that may be substantially confined within an upper cladding and lower cladding of the waveguide. The light may be guided into the optically active stack so that the optical mode of the input waveguide is generally aligned with the optical mode of the stack. Similarly, the output waveguide may be coupled to guide light out of the stack by providing a guiding direction directed substantially out of the stack and along the output waveguide, either directly or through the anti-reflective coating. Light may enter the output waveguide, which has an optical mode that may be substantially confined with an upper cladding and lower cladding of the waveguide. The light may be guided from the optically active stack so that the optical mode of the output waveguide is generally aligned with the optical mode of the stack.

Said another way, the input and output waveguides may lie along a plane which is parallel to or substantially parallel to the optically active stack.

In a second aspect, some embodiments of the invention provide a method of forming an optoelectronic device from a silicon-on-insulator wafer, comprising the steps of:
  (a) growing a multi-layered optically active region on a silicon-on-insulator layer;
  (b) patterning and etching the multi-layered optically active region so as to provide a multi-layered optically active stack;
  (c) depositing an anti-reflective coating around at least a part of the stack; and
  (d) depositing a silicon nitride input waveguide and output waveguide adjacent to the stack, arranged so as to guide light into and out of the stack respectively.

The silicon-on-insulator layer may be adjacent to an insulator layer, i.e. directly above it in a direction away from a plane of the wafer. The multi-layered optically active region may be patterned and etched so as to provide a multi-layered optically active multiple quantum well waveguide. The multi-layered optically active stack may be referred to as a multi-layered optically active mesa after it has been formed by patterning and etching the multi-layered optically active region.

Optional features of the invention will now be set out. These are applicable singly or in any combination with any aspect of the invention.

Anti-reflective coating may be formed of a composition of silicon nitride with a refractive index which is greater than a refractive index of a silicon nitride core layer of either the input waveguide or the output waveguide. The refractive index of the anti-reflective coating may be less than the effective refractive index of the multi-layered optically active stack.

A refractive index of the anti-reflective coating may be at least 2.6 and no more than 2.85.

The anti-reflective coating may have a length, as measured parallel to a guiding direction of the input waveguide, of at least 90 nm and no more than 200 nm.

A refractive index of a core layer of the input waveguide and the output waveguide may be at least 1.9 and no more than 2.35.

The optically active stack may include a multiple quantum well layer.

The optoelectronic device may further comprise:
a first electrode disposed on a first side of the stack and electrically connected thereto; and
a second electrode disposed on a second side of the stack and electrically connected thereto.

The optoelectronic device may further comprise a silicon layer, adjacent to a lower surface of the MQW waveguide.

The optoelectronic device may further comprise an insulator layer, adjacent to the silicon layer underneath the lower surface of the MQW waveguide.

The optoelectronic device may further comprise a silicon substrate, disposed beneath the insulator layer.

The optoelectronic device may further comprise a first and second silicon waveguide, coupled respectively to the input waveguide and the output waveguide. A height of the first silicon waveguide and a height of the second silicon waveguide may be respectively similar to or greater than that of a height of the input waveguide and a height of the output waveguide.

The height of the first silicon waveguide and the height of the second silicon waveguide may taper from a first height to a second height, the second height matching the height of the input and output waveguide respectively.

The core layer of the input waveguide and the core layer of the output waveguide, may each have a height of no more than 1 µm as measured adjacent to the optically active stack.

The multi-layered optically active stack, which may provide the MQW waveguide, may have a height which is no more than 1.4 µm.

The first and second silicon waveguide may have a height of no more than 3 µm.

The method may further comprise a step of depositing an upper capping layer on top of an upper surface of the optically active stack. This step may be performed after a step of waveguide etching and before a step of VIA patterning.

The upper capping layer may be formed of a silicon oxide layer or a silicon nitride layer.

There may be a silicon nitride layer disposed between two insulator layers, each formed of silicon oxide. The silicon nitride layer may operate as an etch or chemical-machine planarization stop.

Patterning the optically active stack may include a step of depositing a photoresist over a portion of the upper surface of the optically active stack, which is removed after the step of etching the optically active stack.

The method may further comprise, after step (c), a step of etching the silicon nitride anti-reflective coating.

The method may further comprise, after etching the anti-reflective coating, a step of depositing bulk insulator onto the device.

The method may further comprise, after depositing the bulk insulator, a step of etching the bulk insulator such that an upper surface of the bulk insulator is aligned with an uppermost surface of a buffer layer of the optically active stack.

BRIEF DESCRIPTION OF THE DRAWINGS

Embodiments of the invention will now be described by way of example with reference to the accompanying drawings in which:

FIG. 4 shows a top-down schematic view of an optoelectronic device according to some embodiments.

DETAILED DESCRIPTION AND FURTHER OPTIONAL FEATURES

Figure 1A:
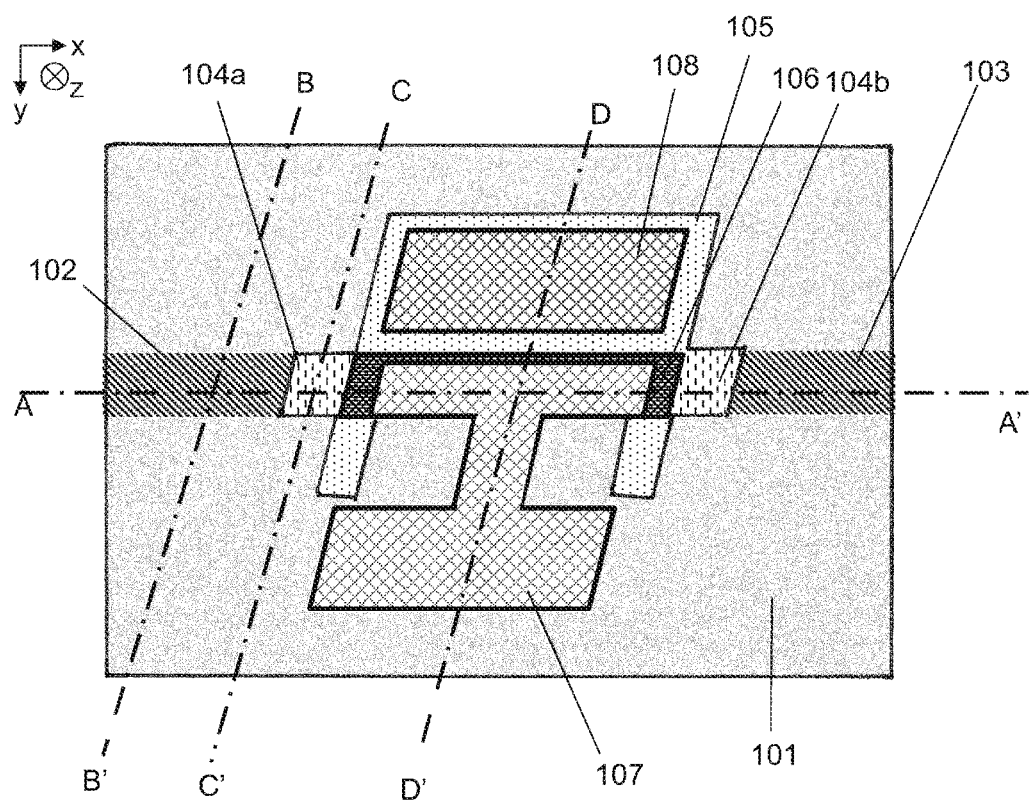
FIG. 1A shows a top-down view of an optoelectronic device according to some embodiments of the present invention.
Figure 1B:
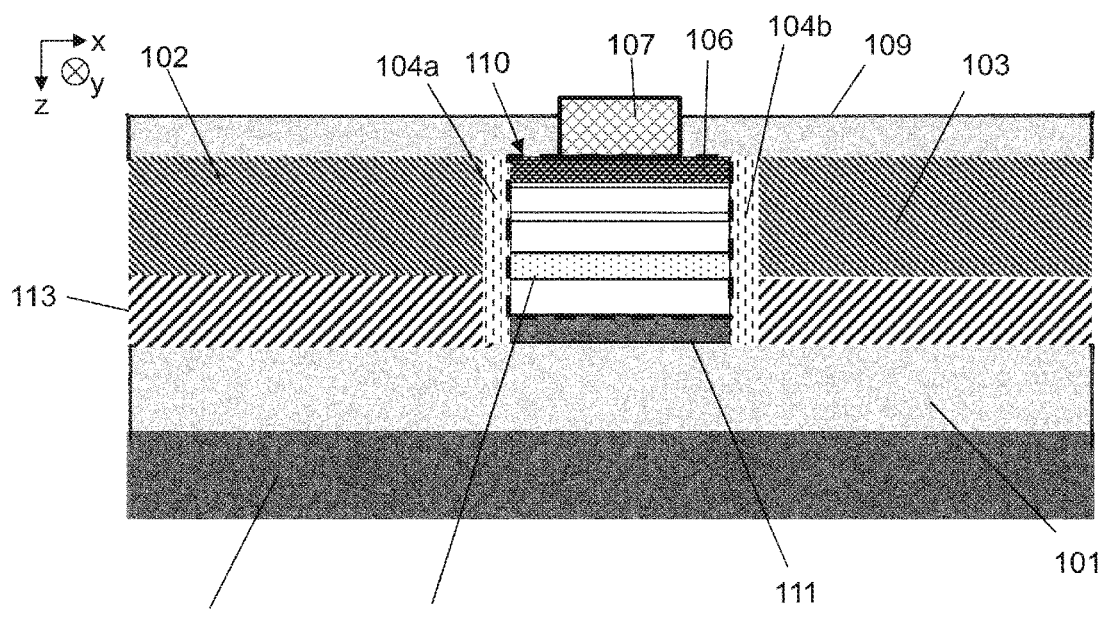
FIG. 1B shows a cross-sectional view of the device in FIG. 1A along the line A-A'.

Aspects and embodiments of the present invention will now be discussed with reference to the accompanying figures. Further aspects and embodiments will be apparent to those skilled in the art. All documents mentioned in this text are incorporated herein by reference FIG. 1A shows a top-down view of an optoelectronic device according to some embodiments of the present invention. Broadly, the device is disposed on a buried oxide layer 101 (for example silicon dioxide). Light enters the device from input waveguide 102, which is formed of silicon nitride. The input waveguide is configured to guide light into a first anti-reflective coating 104a which is formed of silicon nitride having a different composition to the silicon nitride forming the input waveguide. The anti-reflective coating ensures that the majority of the light is transmitted from the input waveguide 102 into an optically active stack e.g. a MQW waveguide 110 which, as is most clearly shown in FIG. 1B, is disposed immediately adjacent to the first anti-reflective coating. The light then passes through the optically active MQW waveguide 110 through a second anti-reflective coating 104b (formed of silicon nitride having the same composition as the first anti-reflective coating 104a) before exiting the device through output waveguide 103 which is also formed of silicon nitride having the same composition as the input waveguide. The device also comprises first and second electrodes 107 and 108. The first electrode 107 contacts an upper layer 106 of the optically active MQW waveguide which is a heavily doped layer. The second electrode 108 electrically compacts a doped buffer layer 105 which is in a lower part of the optically active MQW waveguide 110 i.e. it is closer to the buried oxide layer 101.

FIG. 1B shows the device of FIG. 1A along the cross section A-A'. Here the optically active MQW waveguide 110 can be seen in more detail. The first electrode 107 contacts an upper surface of the optically active MQW waveguide 110 i.e. upper layer 106. Also more clearly seen is how the anti-reflective coating 104a and 104b are disposed immediately adjacent to the optically active MQW waveguide separating it from the input waveguide 102 and output waveguide 103 respectively. Both of these waveguides are disposed above (i.e. on the opposing side to the buried oxide layer 101 to the substrate 112) a further insulating layer 113 which is formed of silicon dioxide. The further insulating layer 113 may have a height, as measured from an uppermost surface of the buried oxide layer 101, of at least 500 nm and no more than 700 nm. A silicon-on-insulator layer 111 is disposed immediately beneath the optically active MQW waveguide 110 and above the insulating layer 101. The upper cladding layer 109, as shown in FIG. 1B, is not shown in FIG. 1A for reasons of clarity.

Figure 1C:
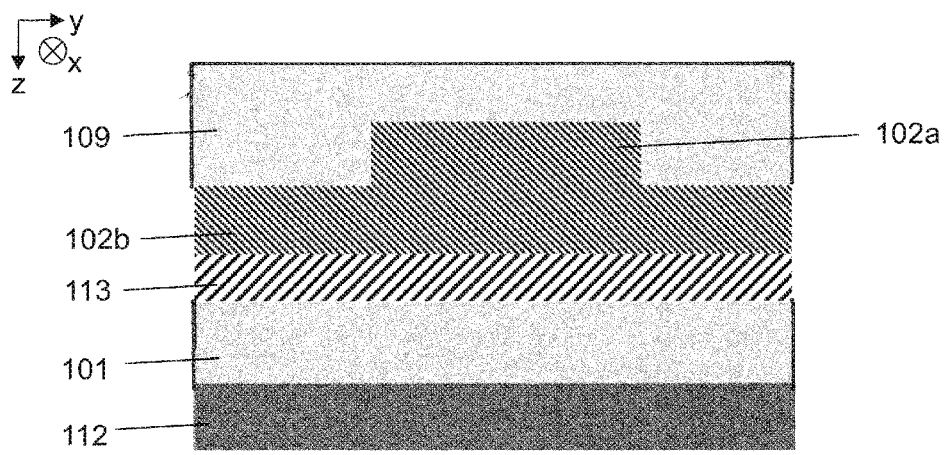
FIG. 1C shows a cross-sectional view of the device in FIG. 1A along the line B-B'.

FIG. 1C shows the device of FIG. 1A along the cross section B-B'. Here it can be seen that the input waveguide 102 comprises two regions: an upper region 102a and a lower region 102b. Both of these are above the further insulating layer 113 which is in turn above the buried oxide layer 101, this layer being disposed above the substrate 112. A height of the lower region 102b, as measured from an upper surface of the upper insulating layer to a lower surface of the upper region 102a, may be around 0.4 µm. A height of the upper region 102a, as measured from an upper surface of the lower region 102b, may be around 0.6 µm. The refractive index of the upper region 102a and the lower region 102b may be around 2.2 at a wavelength of 1310 nm.

The upper region may have a width, as measured perpendicularly to the height and the guiding direction of the waveguide, of around 2.5 µm. The upper region may be referred to as a rib region, and the lower region may be referred to as a slab region. The upper insulating layer 113 may have a height, as measured from an upper surface of the buried oxide layer 101, of around 0.62 µm. The buried oxide layer may have a height, as measured from an upper surface of the silicon substrate 112, of around 2 µm. Also shown in this figure is the upper cladding layer 109. The dimensions and properties of the input waveguide may be substantially the same as those of the output waveguide.

Figure 1D:
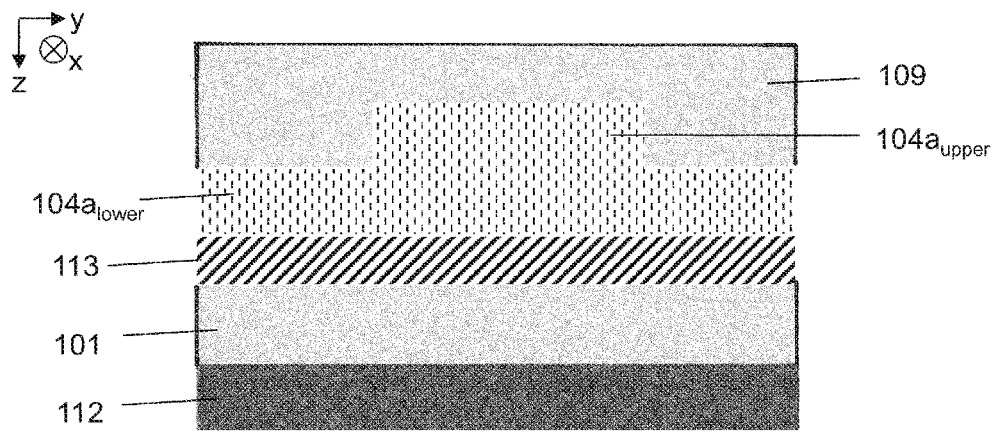
FIG. 1D shows a cross-sectional view of the device in FIG. 1A along the line C-C'.

Similarly, FIG. 1D shows the device as FIG. 1A along the cross section C-C'. As can be seen here, the anti-reflective coating 104a comprises an upper region $104a_{upper}$ and a lower slab region $104a_{lower}$. Both of these are disposed above the further insulating layer 113 in a similar manner to that shown in FIG. 1C. The heights of these regions may be the same as those of the input waveguide, however the refractive index of the upper region and lower region of the anti-reflective coating may be around 2.8 at a wavelength of 1310 nm. The anti-reflective coating may extend in a direction parallel to the guiding direction of the input waveguide for a distance of around 120 nm, i.e. it may be around 120 nm thick as experienced by light passing through the device. The dimensions and properties of the anti-reflective coating 104a may be substantially the same as those of the anti-reflective coating 104b.

Figure 1E:
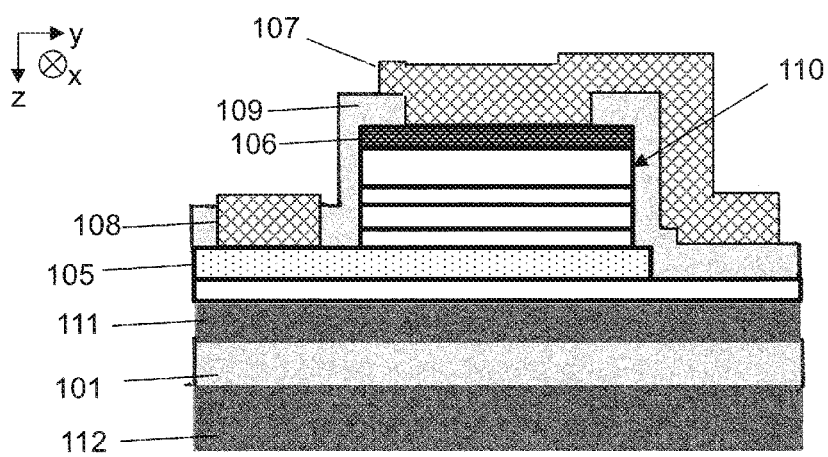
FIG. 1E shows a cross-sectional view of the device in FIG. 1A along the line D-D'.

Finally, FIG. 1E shows the cross section of FIG. 1A taken along the line D-D'. Here, it can be more clearly seen how electrode 107 extends up a side wall of the device and through a via in the upper cladding layer 109 so as to contact an upper surface of the heavily doped region 106 which is a part of the optically active MQW waveguide 110. Similarly, the second electrode 108 extends through a via of the upper cladding layer 109 so as to electrically contact the doped buffer layer 105.

FIG. 4 schematically shows an optically active stack (e.g., a multi-layered optically active stack) and anti-reflective coatings, a tapered input waveguide, a tapered output waveguide, a first silicon waveguide coupled to the tapered input waveguide, and a second silicon waveguide coupled to the tapered output waveguide. In some embodiments, the first and second silicon waveguides may each have a height of no more than 3 µm. In some embodiments, a height of the first silicon waveguide and a height of the second silicon waveguide are respectively greater than that of a height of the tapered input waveguide and a height of the tapered output waveguide. In some embodiments, the height of the tapered input waveguide tapers from the height of the first silicon waveguide to the height of the multi-layered optically active stack and the height of the tapered output waveguide tapers from the height of the multi-layered optically active stack to the height of the second silicon waveguide.

Figure 2:
FIG. 2 shows a cross-sectional schematic view of an optically active stack.

FIG. 2 shows in more detail a composition of the optically active MQW stack 110 on an SOI wafer with 220 nm device layer. Going from the upper most layer downwards: a heavily doped layer 106; an upper doped layer 201: a spacer layer 202; a multiple quantum well layer 203; further spacer layer 204; a doped buffer layer 105; and finally a transit buffer layer 205. The heavily doped layer 106 generally comprises an $Si_{0.8}Ge_{0.2}$ layer which has been N+ doped to a concentration of greater than $1 \times 10^{19}$ cm$^{-3}$ and which has a height of around 80 nm. The upper doped layer 201 comprises a $Si_{0.18}Ge_{0.82}$ material doped with an N type dopant to a concentration of around $1 \times 10^{18}$ cm$^{-3}$, and the layer is around 300 nm tall. For both N doped layers, the dopant species may be phosphorus. The two spacer layers 202 and 204 may have the same composition of the upper doped layer 201 e.g. $Si_{0.18}Ge_{0.82}$ but may be undoped. The spacer layers may be around 15nm tall as measured perpendicular to the surface of the device. The multiple quantum well layer 203 may comprise a $Ge/Si_{0.33}Ge_{0.87}$ material which is around 188 nm tall. The multiple quantum well layer may comprise around 8 Ge quantum wells, which are around 12 nm tall with a 10 nm $Si_{0.33}Ge_{0.87}$ barrier between each quantum well, and a total of 9 barriers. The buffer layer 105 may comprise a material formed from $Si_{0.18}Ge_{0.82}$ and can be P type doped to a concentration of around $1 \times 10^{18}$ cm$^{-3}$. The buffer layer may be around 400 nm tall, and the P type dopant may be a species of boron. The transit buffer layer 205 may comprise a material formed of $Si_{0.8}Ge_{0.2}$ and may be around 400 nm tall. These layers define the optically active MQW stack 110. The optically active MQW stack 110 may be disposed immediately on top of a 220 nm tall silicon-on-insulator layer. This silicon-on-insulator layer is immediately above a 2000 nm tall buried oxide layer (BOX). Finally, the buried oxide layer is disposed immediately above a silicon substrate layer 112.

Figure 3A:
FIGS. 3A-3Q(c)(ii) show various manufacturing steps according to some embodiments of the present invention.
Figure 3B:
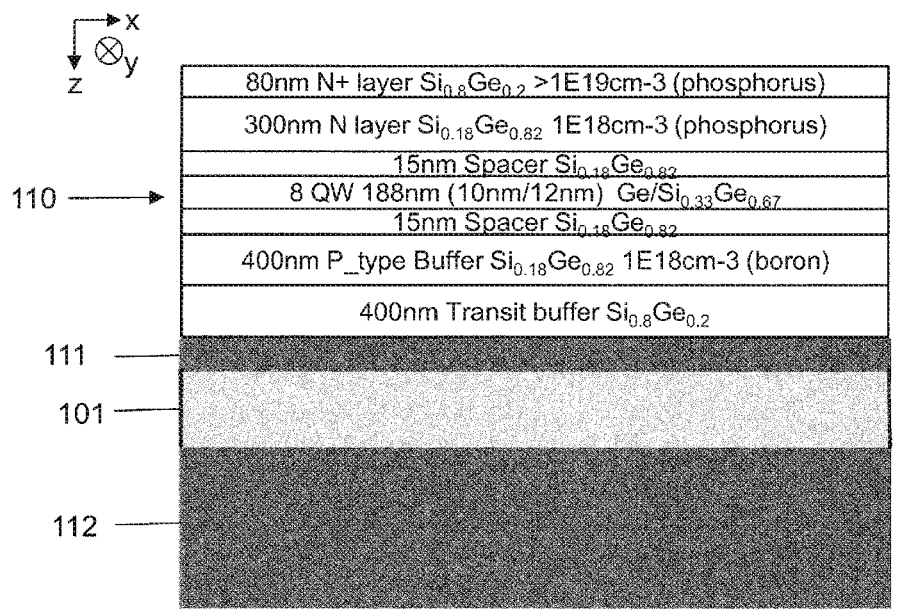
Figure 3C:
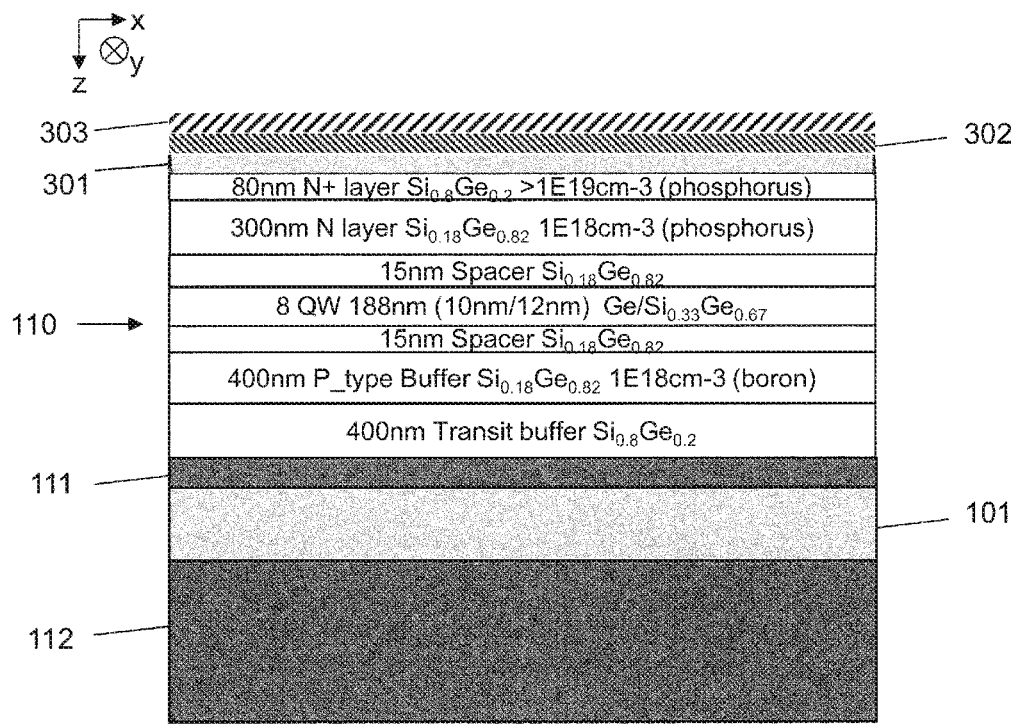
Figure 3D:
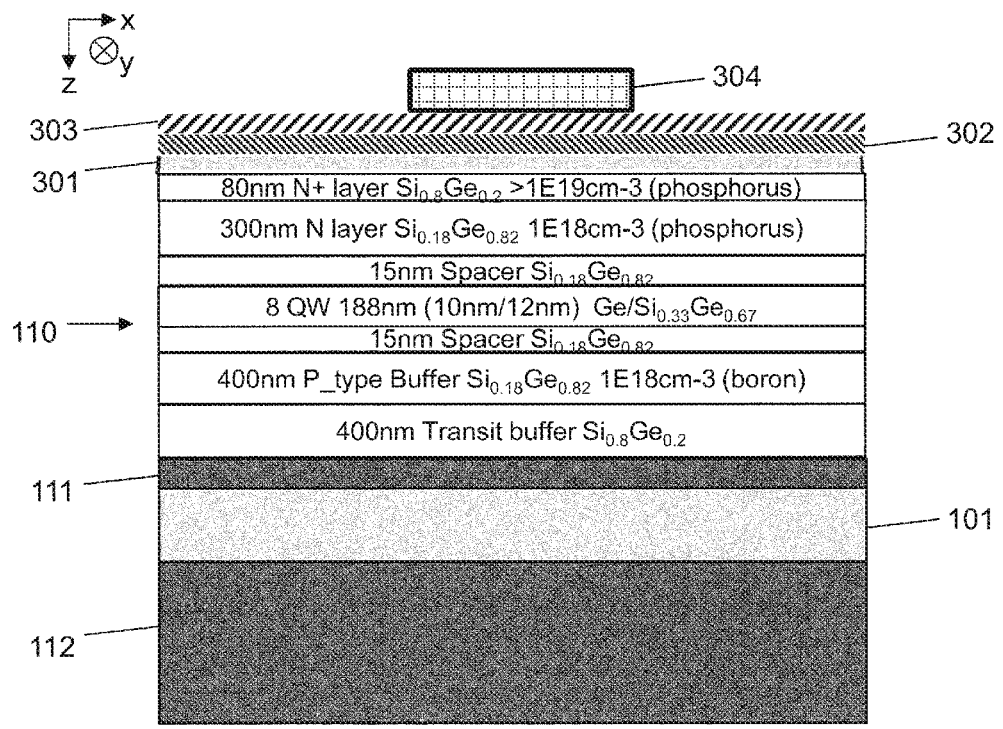
Figure 3F:
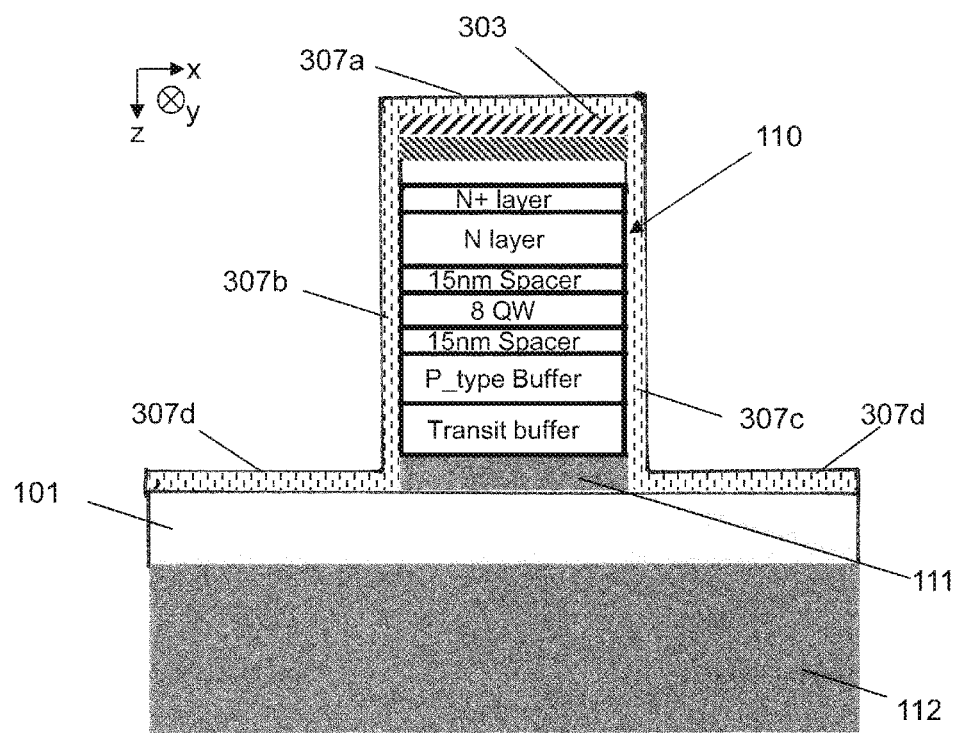
Figure 3G:
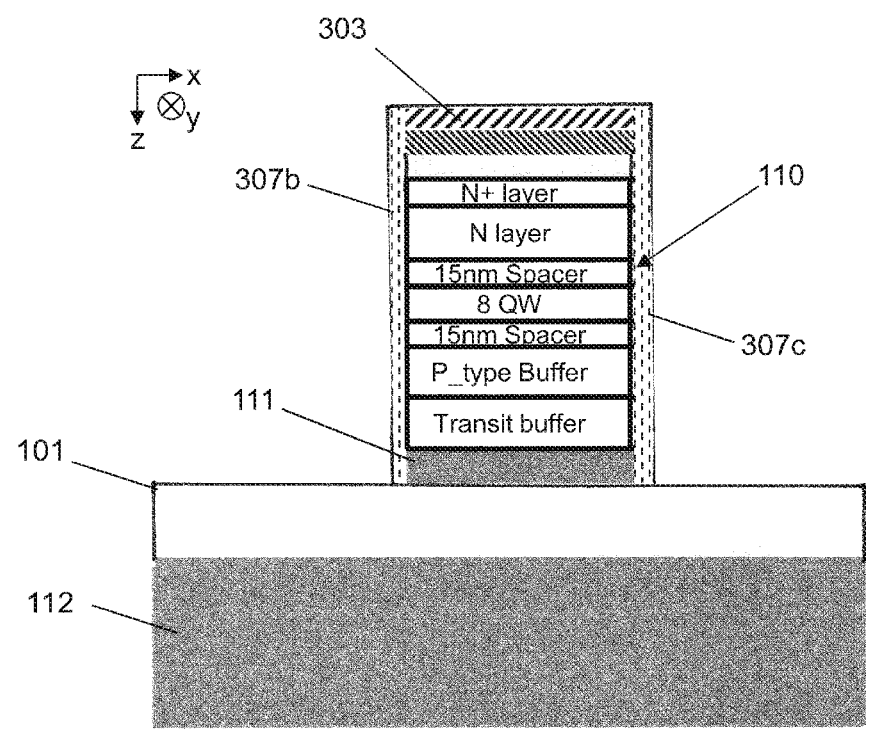
Figure 3H:
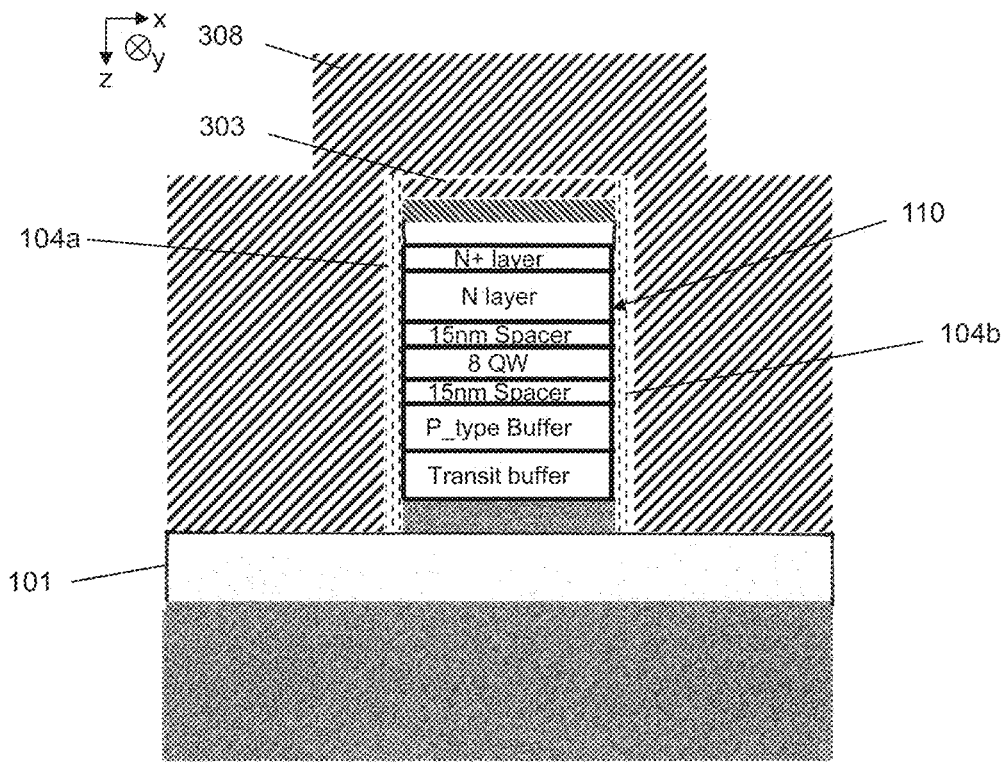
Figure 3I:
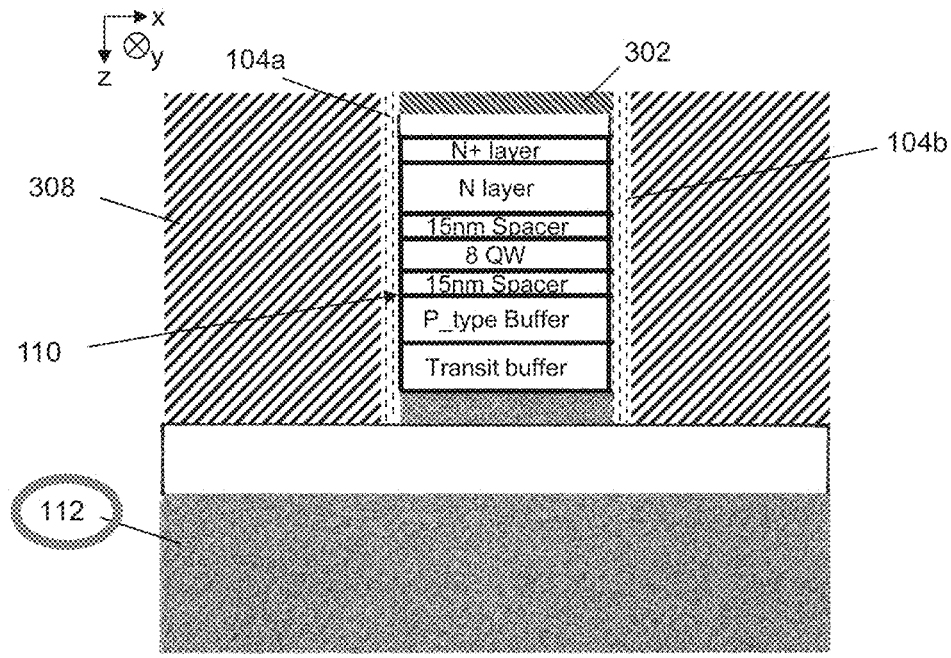
Figure 3J:
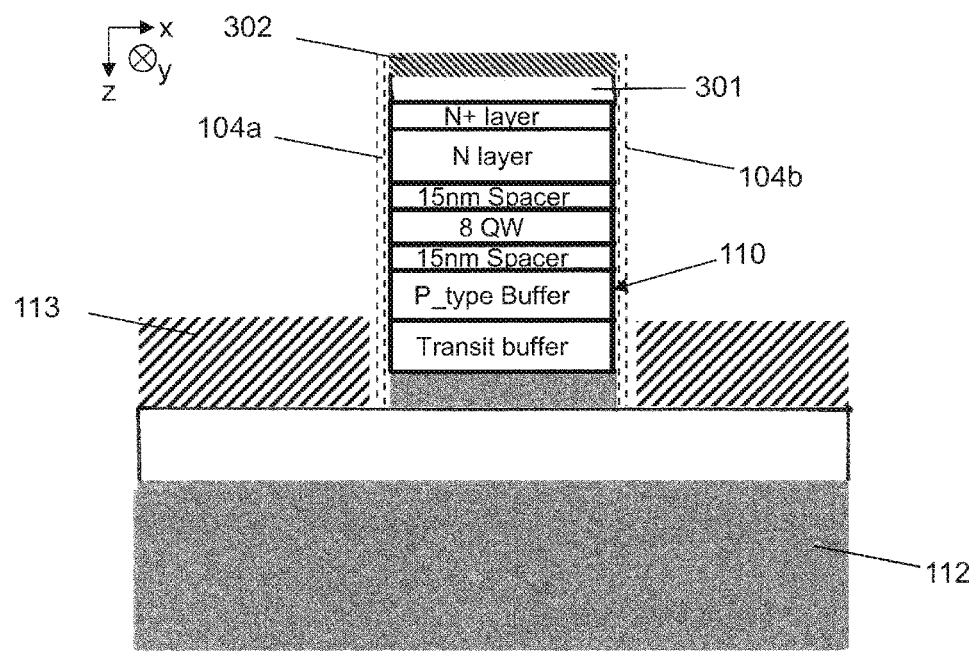
Figure 3K:
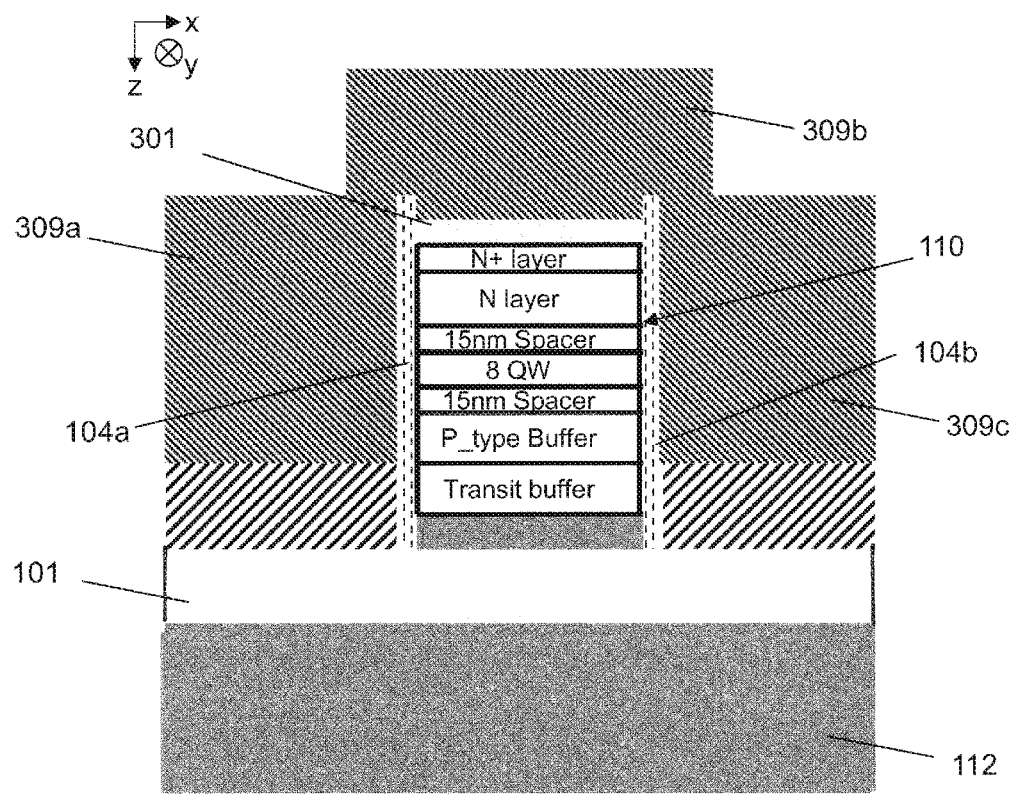
Figure 3L:
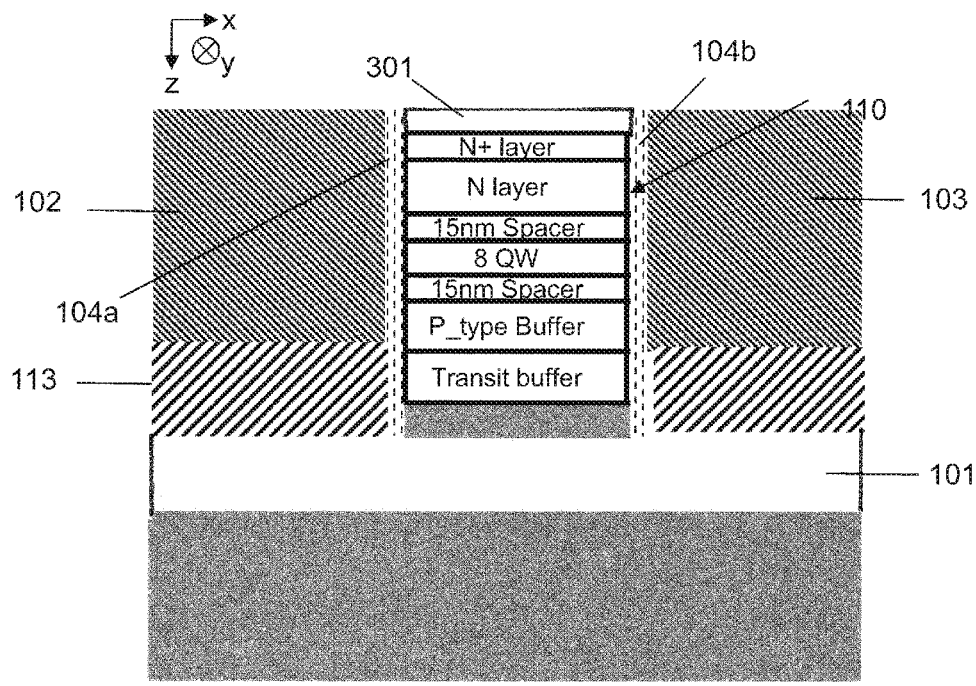
Figure 3M:
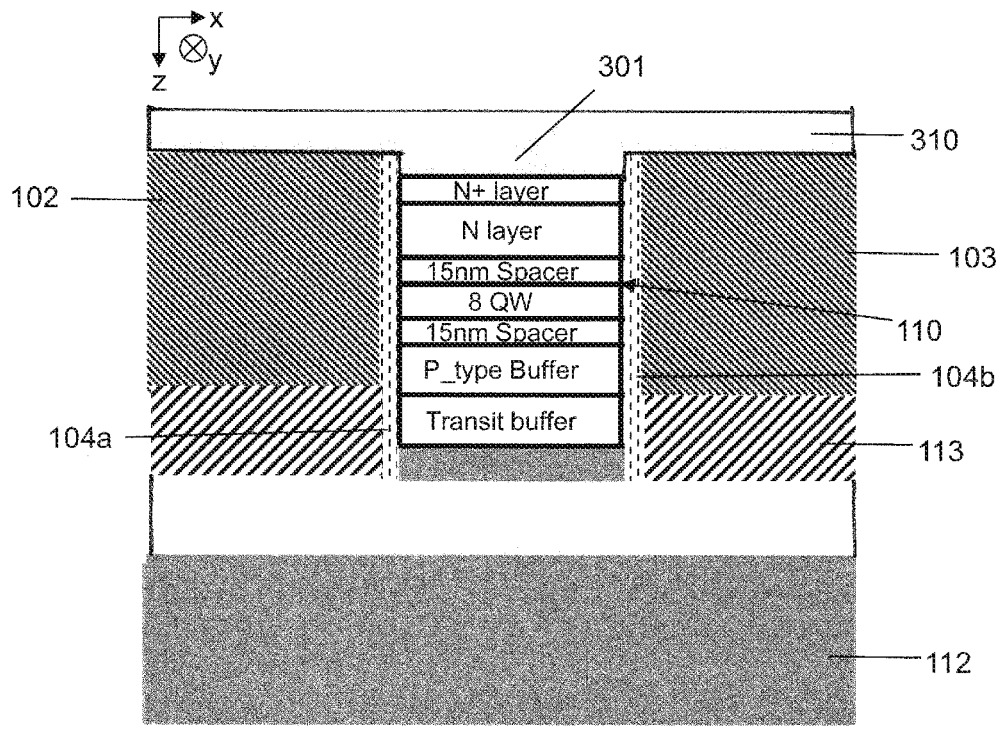
Figure 3O:
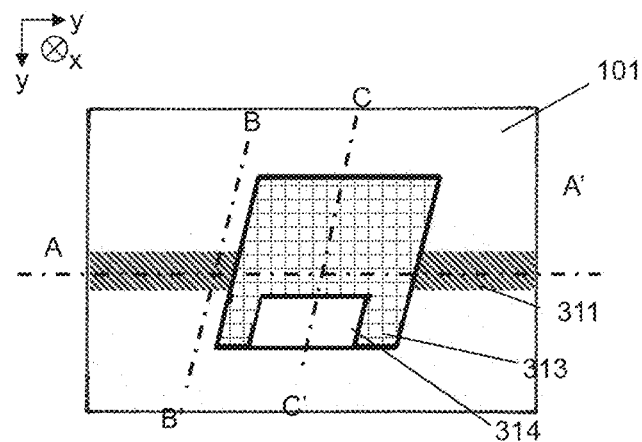
Figure 3O:
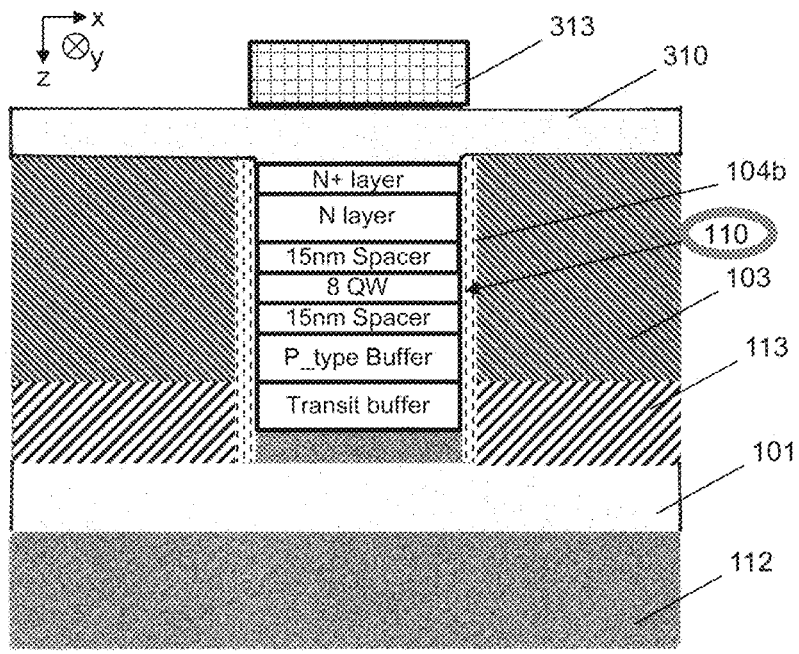
Figure 3O:
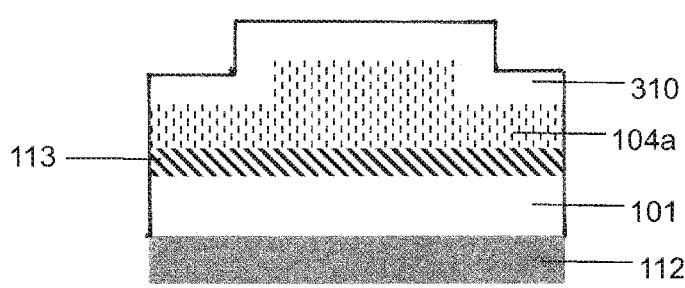
Figure 3O:
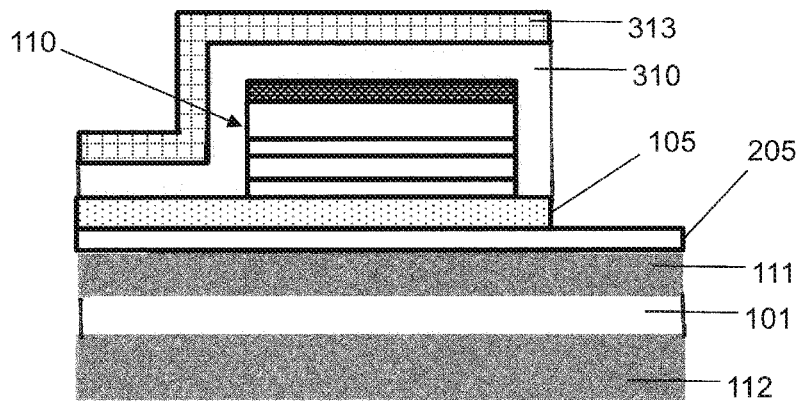
Figure 3P:
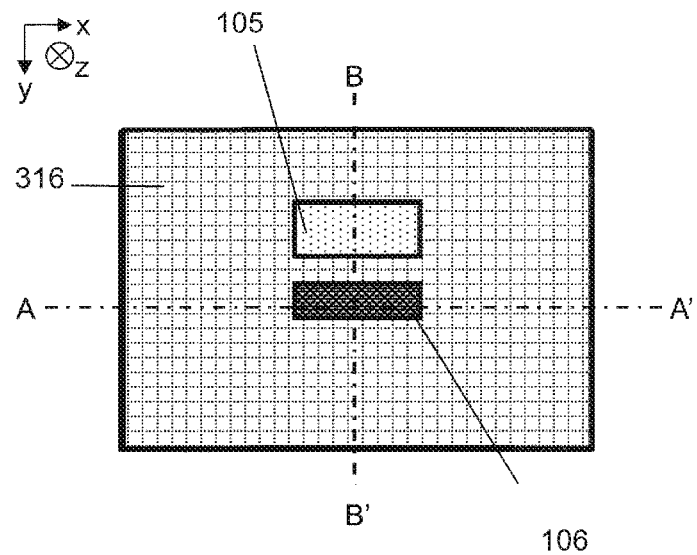
Figure 3P:
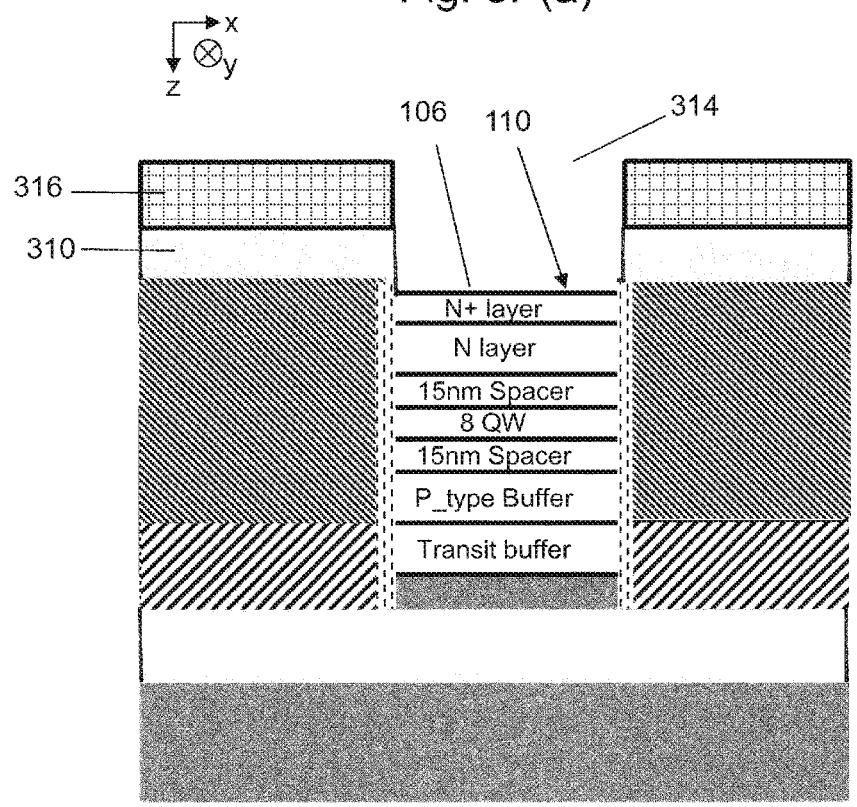
Figure 3Q:
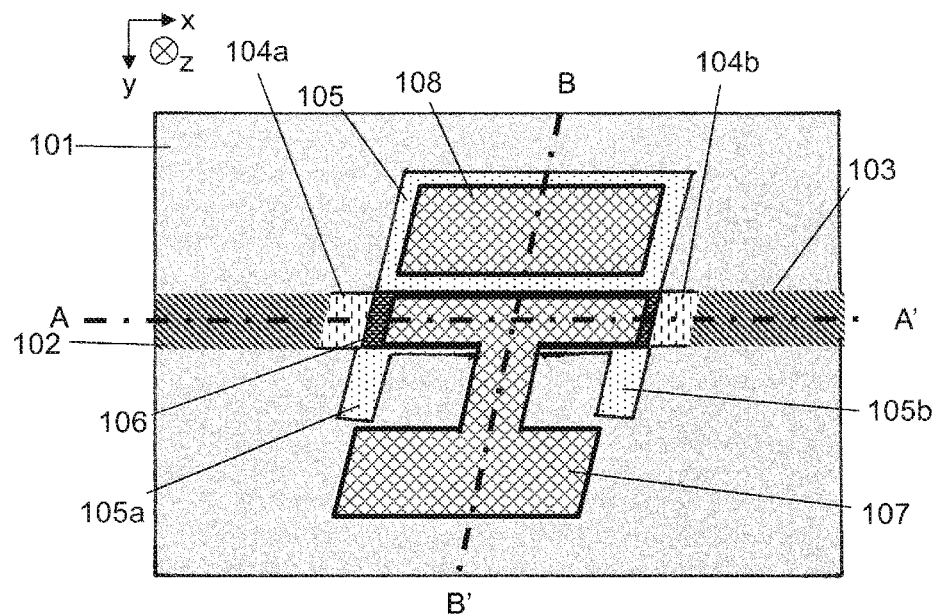
Figure 3Q:
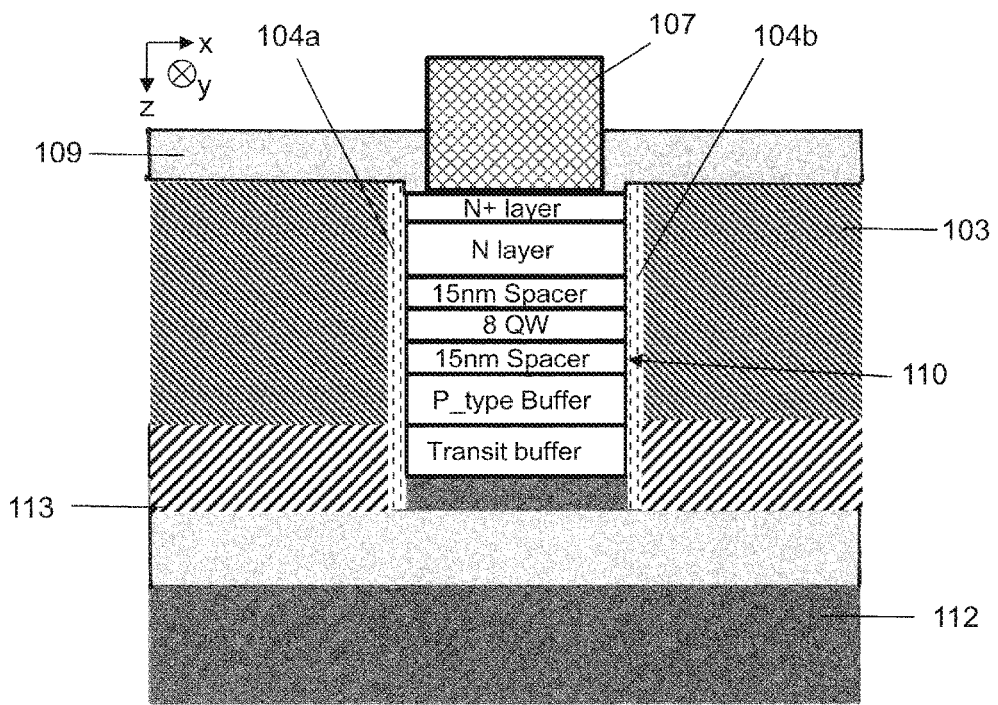

FIGS. 3A-3Q(c)(ii) show the manufacturing of two variations of the device. Starting from FIG. 3A, a silicon-on-insulator wafer is provided which comprises a silicon-on-insulator layer 111 immediately above a buried oxide layer 101, which is immediately above a silicon substrate 112. Next, as shown in FIG. 3B, the optically active MQW stack 110 as described above is epitaxially grown from the silicon-on-insulator layer 111. In a subsequent step, as shown in FIG. 3C, a lower silica layer 301 is disposed immediately on top of the optically active MQW stack 110. Above this lower silica layer a silicon nitride layer 302 is disposed, and above this an upper silica layer 303 is disposed. The resulting structure is as shown in FIG. 3C and may be referred to as a capping layer. Next, a $1^{st}$ photoresist 304 is disposed over a portion of the upper silica layer 303. The dimensions of this $1^{st}$ photoresist 304 define the overall dimensions of the resulting optically active MQW stack mesa 110, which may provide the optically active MQW waveguide.

FIG. 3D(i) shows a top down view of the manufacturing step shown in FIG. 3D. Of note here, is that relative to the guiding direction 305 of the finished device, the $1^{st}$ photoresist 304 is disposed at an angle of about 8 degrees. This angle can further reduce the back reflection of the device from the interface between the $Si_3N_4$ waveguide and the optically active MQW waveguide. FIG. 3D(ii) shows an alternative step where the $1^{st}$ photoresist 304 is only partially disposed over the region and a gap 306 is left. The edge of the gap 306 will be close (around 0.6 μm) to the edge of optically active MQW waveguide which will be formed subsequently in the step shown in FIG. 3N. Therefore the step of etching the P buffer layer for the top electrode clear area as shown in FIG. 3O(d) is not needed (as compared to the example in FIG. 3D(i) since the gap serves as the top electrode clear area to minimize the parasitic capacitance for high speed. Devices manufactured according to the step shown in FIG. 3D(ii) are referred to as case 2 devices, whereas devices manufactured according to the step shown in FIG. 3D(i) are referred to as case 1 devices. In both cases, after the $1^{st}$ photoresist 304 is disposed, the remaining device is etched so as to produce an optical active MQW mesa as shown in FIG. 3E. After the $1^{st}$ photoresist is removed, the upper most layer is the upper silica layer 303 as shown in FIGS. 3E, 3E(i), and FIG. 3E(ii). FIG. 3E(i) corresponds to a case 1 device, whereas FIG. 3E(ii) corresponds to a case 2 device.

In a next step, as shown in FIG. 3F, a silicon nitride layer 307 is disposed over all exposed surfaces of the device. Therefore the resulting silicon nitride layer can be described as having an upper most portion 307a immediately adjacent to the upper silica layer 303. It also comprises first and second wall portion 307b and 307c, and a slab region 307d on each side of the optically active MQW mesa 110. The wall portion 307b and 307c will ultimately become the first and second anti-reflective coating 104a and 104b as shown in FIG. 1. In order to achieve this, as shown in FIG. 3G, the upper most portion 307a and the slab portion 307d are etched away with anisotropic etching such that only the side wall portion 307b and 307c remain. After this, as shown in FIG. 3H, a blanket silica layer 308 is deposited from the buried oxide layer 101 so as to substantially surround the anti-reflective coating 104a 104b and the upper silica layer 303. After this, as shown in FIG. 3I, the device is chemical-mechanically polished such that an upper most layer, of the optically active device, is the silicon nitride layer 302.

After this, and in a step shown in FIG. 3J, the bulk silica 308 is etched down so that an uppermost surface of it is aligned to an uppermost surface of the transit buffer layer of the optically active MQW mesa 110. The bulk silica layer now forms the insulator layer 113 as shown in FIG. 1. Next, as shown in FIG. 3K, a blanket silicon nitride layer 309 is deposited from the insulating layer 113. This blanket silicon nitride layer can be described as having first and second portions 309a and 309c and an upper portion 309b. Therefore, in order to arrive at the input and output waveguides 102 and 103 previously described, a further chemical-mechanical polishing process is performed until the uppermost surface of the silicon nitride layer 309 is aligned with the uppermost surface of the lower silica layer 301. The result of this is shown in FIG. 3L. Next, a silica layer 310 is deposited from upper silica layer 301. This is shown in FIG. 3M. The silica layer 310 will ultimately become the upper cladding layer.

FIGS. 3N(a)(i)-3N(d)(i) illustrate manufacturing steps corresponding to case 1 devices (with reference to FIG. 3E(i) above), whereas FIGS. 3N(a)(ii)-3N(d)(ii) illustrate manufacturing steps corresponding to case 2 devices (with reference to FIG. 3E(ii) above).

In FIG. 3N(a)(i), a second photoresist 311 has been disposed over an upper surface of the device and the device has been etched down to the upper surface of the P doped buffer layer 105, so that a portion of the P doped buffer layer 105 is exposed and the lower region of the anti-reflective coating $104a_{lower}$, and the silicon nitride waveguide slab 102b are formed. The geometry of the second photoresist general matches the desired waveguide structure.

FIG. 3N(b)(i) is a cross-sectional view of FIG. 3N(a)(i) along the line A-A'. Here, it can be seen that the second photoresist 311 extends along the upper surface of the silica layer 310 from a one end of the input waveguide 102, to an opposing end of the output waveguide 103. FIG. 3N(c)(i) is a cross-sectional view of FIG. 3N(a)(i) along the line B-B', and shows that the second photoresist is disposed above the upper region of the anti-reflective coating but not the lower region of the anti-reflective coating. Finally, FIG. 3N(d)(i) shows a cross-sectional view of FIG. 3N(a)(i) along the lines C-C'. Here, it can be seen that the layers of the optically active MQW mesa 110 have been etched so that the P doped buffer layer 105 has an exposed upper surface.

FIG. 3N(a)(ii) shows a variation of FIG. 3N(a)(i), for a case 2 device. Of note, is that the device within the gap 306 is etched all the way down to the buried oxide layer 101. The distance between the edge of the gap 306 to the edge of the waveguide 110 is about 0.6 μm. Therefore, as shown in FIG. 3N(b)(ii), after the etching process, in the gap of 306 a combination of a silicon dioxide layer 113 and a silicon nitride layer of 312 is formed. The silicon dioxide layer 113 is formed from an uppermost surface of the buried oxide layer such that an uppermost surface of the silicon dioxide layer is aligned with a lowermost surface of the buffer layer 105, and the silicon nitride layer 312 is on top of the silicon dioxide layer 113 with an uppermost surface thereof aligned with an uppermost surface of the buffer layer 105. This silicon nitride layer 312 has been provided as a result of the earlier step where silicon nitride was deposited (shown in FIG. 3K).

Moving to FIGS. 3O(a)-3O(d), these illustrate manufacturing steps which take place for case 1 devices only (i.e. those corresponding to FIG. 3E(i) discussed above). As shown in FIG. 3O(a), a third photoresist 313 is disposed over a portion of the device to make a gap 314. The distance between the edge of the gap 314 to the edge of the MQW waveguide 311 is about 0.6 μm. The portion exposed in the gap 314 is then etched down to expose the transit buffer layer 205. This is shown most clearly in FIG. 3O(d) which is a cross-section of FIG. 3O(a) taken along the line C-C'. FIGS. 3O(b) and 3O(c) corresponding to cross-sections of FIG. 3O(a) along the lines A-A' and B-B' respectively.

FIG. 3P(a) shows a top-down view of a further manufacturing step, applicable for both cases. A fourth photoresist 316 is disposed over most of an upper surface of the device, and the device is etched so as to leave the buffer layer 105 and heavily doped layer 106 exposed. This is shown along the cross-section A-A' in FIG. 3P(b) where a via 314 is present above the optically active MQW waveguide 110. FIG. 3P(c)(i) shows a first variation of the device in FIG. 3P(a) taken along the cross-section B-B' corresponding to a case 1 device. Here the first via 314 and second via 315 can be more easily seen located respectively above the heavily doped layer 106 and buffer layer 105. In the case 2 variant of this, as shown in FIG. 3P(c)(ii), the silicon nitride layer 312 and insulating layer 113 can be seen below the third photoresist 316.

In a subsequent metallisation step, shown in FIGS. 3Q(a) to FIG. 3Q(c)(ii), the first electrode 107 and second electrode 108 are deposited so as to respectively contact the heavily doped layer 106 and buffer layer 105. The result is the device as shown in FIG. 1A.

FIG. 3Q(b) shows a cross-sectional view of the device shown in FIG. 3Q(a) taken along the cross-section A-A' where the electrical connection between the first electrode 107 and the heavily doped layer 106 can be more easily seen.

FIG. 3Q(c)(i) shows a cross-sectional view of the device in FIG. 3Q(a) taken along the B-B' for a case 1 device. It can be more clearly seen here how the first electrode 107 extends away from the silicon-on-insulator layer 111 so as to contact an uppermost surface of the heavily doped layer 106. Similarly, this view shows how second electrode 108 extends through the upper cladding layer 109 so as to electrically contact the buffer layer 105. FIG. 3Q(c)(ii) shows a variation of the previous figure, and corresponds to a case 2 device, where the silicon-nitride layer 312 and insulator layer 113 can be seen.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

LIST OF FEATURES

101 Buried oxide layer
102 Input waveguide
103 Output waveguide
104a,b Anti-reflective coating
105 Buffer layer
106 Heavily doped layer
107 First electrode
108 Second electrode
109 Upper cladding layer
110 Optically active stack, MQW mesa, or MQW waveguide
111 Silicon-on-insulator layer
112 Silicon substrate
113 Silicon dioxide layer
201 Upper doped layer
202, 204 Spacer layer
203 Multiple quantum well layer
205 Transit buffer
301 Lower silica layer
302 Silicon nitride layer
303 Upper silica layer
304 $1^{st}$ Photoresist
305 Guiding direction
306 Gap
307a-d Silicon nitride
308 Blanket silica
309a-d Blanket silicon nitride
310 Silica layer
311 Second photoresist
312 Silicon nitride
313 Third photoresist
314 $1^{st}$ Via
315 $2^{nd}$ Via
316 Fourth photoresist

The invention claimed is:

1. A method of forming an optoelectronic device from a silicon-on-insulator wafer, the optoelectronic device comprising:
an insulator layer;
a multi-layered optically active stack above the insulator layer;
a silicon layer between the insulator layer and the multi-layered optically active stack;
an input waveguide, arranged to guide light into the multi-layered optically active stack;
an output waveguide, arranged to guide light out of the multi-layered optically active stack; and
anti-reflective coatings, located between the input waveguide and the multi-layered optically active stack and also located between the multi-layered optically active stack and the output waveguide,
wherein the input waveguide and output waveguide are formed of silicon nitride, and
wherein the method comprises the steps of:
(a) growing a multi-layered optically active region on the silicon layer, which is adjacent to the insulator layer;
(b) patterning and etching the multi-layered optically active region so as to provide the multi-layered optically active stack;
(c) depositing the anti-reflective coatings around at least a part of the multi-layered optically active stack; and
(d) depositing the silicon nitride input waveguide and output waveguide adjacent to the multi-layered optically active stack, arranged so as to guide light into and out of the multi-layered optically active stack respectively.

2. The method of claim 1, wherein the anti-reflective coatings are formed of a composition of silicon nitride with a refractive index which is greater than a refractive index of a silicon nitride core layer of either the input waveguide or the output waveguide.

3. The method of claim 1, wherein a refractive index of one of the anti-reflective coatings is at least 2.6 and no more than 2.85.

4. The method of claim 1, wherein one of the anti-reflective coatings has a length, as measured parallel to a guiding direction of the input waveguide, of at least 90 nm and no more than 200 nm.

5. The method of claim 1, wherein a refractive index of a core layer of the input waveguide and the output waveguide is at least 1.9 and no more than 2.35.

6. The method of claim 1, wherein the multi-layered optically active stack includes a multiple quantum well layer.

7. The method of claim 1, wherein the optoelectronic device further comprises:
a first electrode disposed on a first side of the multi-layered optically active stack and electrically connected thereto; and
a second electrode disposed on a second side of the multi-layered optically active stack and electrically connected thereto.

8. The method of claim 1, wherein the optoelectronic device further comprises a silicon substrate, disposed beneath the insulator layer.

9. The method of claim 1, wherein the optoelectronic device further comprises a first and second silicon waveguide, coupled respectively to the input waveguide and the output waveguide.

10. The method of claim 9, wherein each of the first and second silicon waveguide have a height of no more than 3 µm.

11. The method of claim 9, wherein a height of the first silicon waveguide and a height of the second silicon waveguide are respectively greater than that of a height of the input waveguide and a height of the output waveguide.

12. The method of claim 11, wherein the height of the input waveguide tapers from the height of the first silicon waveguide to the height of the multi-layered optically active stack and the height of the output waveguide tapers from the height of the multi-layered optically active stack to the height of the second silicon waveguide.

13. The method of claim 1, wherein the input waveguide, output waveguide, and multi-layered optically active stack each have a height as measured adjacent to the multi-layered optically active stack which is no more than 1 µm.

14. The method of claim 1, further comprising, between steps (a) and (b), a step of depositing an upper capping layer on top of an upper surface of the multi-layered optically active stack.

15. The method of claim 14, wherein the upper capping layer is formed of a silicon nitride layer disposed between two insulator layers.

16. The method of claim 1, wherein patterning the multi-layered optically active stack includes a step of depositing a photoresist over a portion of an upper surface of the multi-layered optically active stack, which is removed after the step of etching the multi-layered optically active stack.

17. The method of claim 1, further comprising, after step (c), a step of etching the anti-reflective coatings.

18. The method of claim 17, further comprising, after the step of etching the anti-reflective coatings, a step of depositing bulk insulator onto the optoelectronic device.

19. The method of claim 18, further comprising, after depositing the bulk insulator, a step of etching the bulk insulator such that an upper surface of the bulk insulator is aligned with an uppermost surface of a buffer layer of the multi-layered optically active stack.

20. The method of claim 1,
wherein the input waveguide directly contacts the anti-reflective coating between the input waveguide and the multi-layered optically active stack.

21. The method of claim 1,
wherein a refractive index of the anti-reflective coating between the input waveguide and the multi-layered optically active stack is greater than a refractive index of a silicon nitride core layer of the input waveguide.

* * * * *